(12) United States Patent
Lee et al.

(10) Patent No.: US 10,117,242 B2
(45) Date of Patent: Oct. 30, 2018

(54) METHOD OF PERFORMING CONTENTION BASED MULTIPLE ACCESS (MA) IN WIRELESS COMMUNICATION SYSTEM AND APPARATUS THEREFOR

(71) Applicant: LG ELECTRONICS INC., Seoul (KR)

(72) Inventors: Sangrim Lee, Seoul (KR); Kwangseok Noh, Seoul (KR); Dongkyu Kim, Seoul (KR); Hojae Lee, Seoul (KR); Myeongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 15/411,696

(22) Filed: Jan. 20, 2017

(65) Prior Publication Data

US 2018/0213528 A1      Jul. 26, 2018

(51) Int. Cl.
| | |
|---|---|
| *H04J 3/00* | (2006.01) |
| *H04W 72/04* | (2009.01) |
| *H04W 16/28* | (2009.01) |
| *H04L 5/22* | (2006.01) |
| *H04W 74/08* | (2009.01) |
| *H04W 4/00* | (2018.01) |
| *H04W 4/70* | (2018.01) |

(52) U.S. Cl.
CPC ......... *H04W 72/0446* (2013.01); *H04L 5/22* (2013.01); *H04W 16/28* (2013.01); *H04W 72/0413* (2013.01); *H04W 74/08* (2013.01); *H04W 4/005* (2013.01); *H04W 4/70* (2018.02)

(58) Field of Classification Search
CPC ............ H04W 72/0446; H04W 16/28; H04W 72/0413; H04W 74/08; H04L 5/22
USPC .......................................................... 370/337
See application file for complete search history.

(56) References Cited

U.S. PATENT DOCUMENTS

| | | | |
|---|---|---|---|
| 2013/0182683 A1* | 7/2013 | Seol .................... | H04W 72/046 370/335 |
| 2017/0164377 A1* | 6/2017 | Ho ........................ | H04W 16/28 |
| 2017/0311276 A1* | 10/2017 | Tsai .................. | H04W 56/0045 |

* cited by examiner

*Primary Examiner* — Sai Ming Chan
(74) *Attorney, Agent, or Firm* — Lee, Hong, Degerman, Kang & Waimey PC

(57) ABSTRACT

A method of performing contention based multiple access (MA) by a base station in a wireless communication system, includes receiving information regarding a best beam ID (identifier) from each user equipment (UE), allocating a resource for contention based multiple access per beam based on a number of best beam ID per beam obtained from the information regarding the best beam ID received from the each UE, and transmitting information regarding the resource for the contention based multiple access allocated per beam, to the each UE. In this case, an amount of the resource allocated for the contention based multiple access per beam is in proportion to the number of best beam ID per beam.

16 Claims, 7 Drawing Sheets

FIG. 8
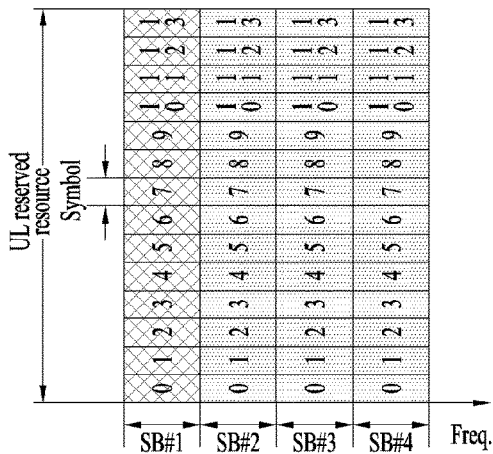
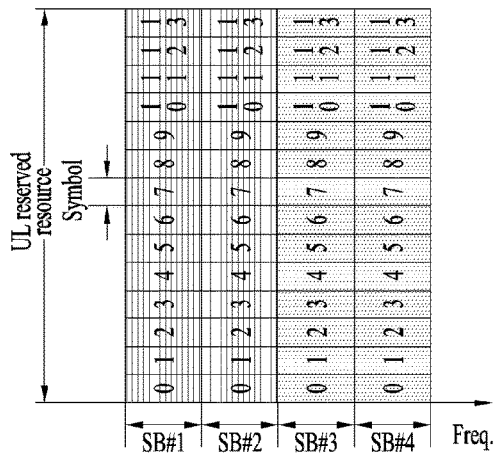
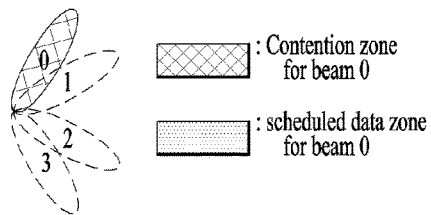
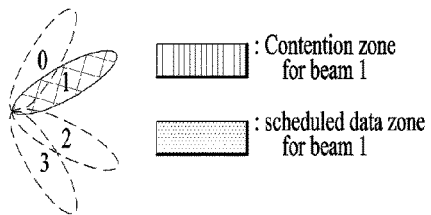
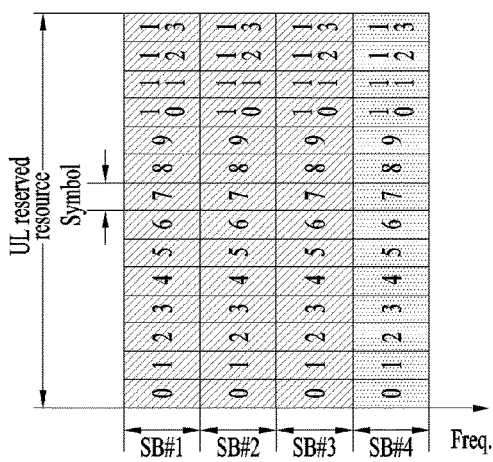
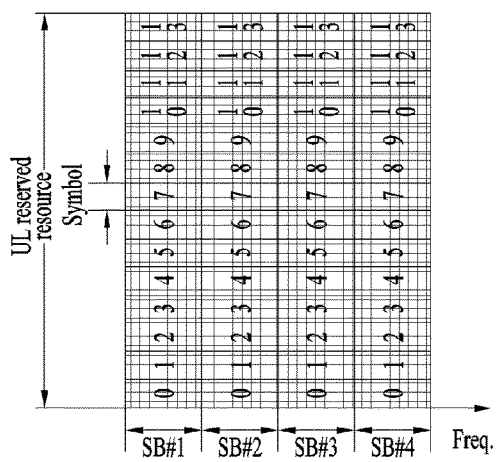
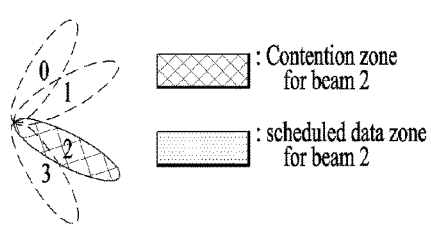
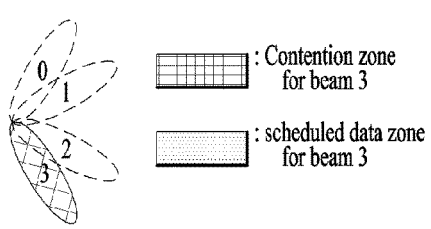

METHOD OF PERFORMING CONTENTION BASED MULTIPLE ACCESS (MA) IN WIRELESS COMMUNICATION SYSTEM AND APPARATUS THEREFOR

BACKGROUND OF THE INVENTION

Field of the Invention

The present invention relates to a wireless communication, and more particularly, to a method of performing contention based multiple access (MA) in a wireless communication system and an apparatus therefor.

Discussion of the Related Art

As more communication devices require greater communication capacity, necessity for mobile broadband communication, which is enhanced compared to a legacy radio access technology (RAT), is emerging. And, a massive MTC (machine type communication) for providing various services at anytime and anywhere by connecting a plurality of devices and objects with each other also corresponds to one of main issues to be considered in a next generation communication.

Moreover, discussion on a communication system to be designed in consideration of a service/UE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

SUMMARY OF THE INVENTION

Accordingly, the present invention is directed to an apparatus and method thereof that substantially obviate one or more problems due to limitations and disadvantages of the related art.

A technical task of the present invention is to provide a method for a base station to perform contention based multiple access (MA) in a wireless communication system.

Another technical task of the present invention is to provide a base station for performing contention based multiple access (MA) in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of performing contention based multiple access (MA by a base station in a wireless communication system, includes the steps of receiving information regarding a best beam ID (identifier) from each user equipment (UE), allocating a resource for contention based multiple access per a beam based on a number of best beam ID per beam obtained from the information regarding the best beam ID received from the each UE, and transmitting information regarding the resource for the contention based multiple access allocated per beam, to the each UE. In this case, an amount of the resource allocated for the contention based multiple access per beam may be in proportion to the number of best beam ID per beam.

The method can further include the step of receiving a contention based signal from a first UE on a resource for contention based multiple access for a beam reported as a best beam ID from the first UE.

The resource for the contention based multiple access may be semi-persistently allocated per beam. The information regarding the resource for the contention based multiple access allocated per beam may be transmitted through a broadcast message, RRC (radio resource control) signaling, or physical layer signaling. The reported best beam ID may be determined by a manner of being measured on a wideband. The amount of the resource allocated for the contention based multiple access per beam may correspond to a symbol unit or a slot unit. The resource allocated for the contention based multiple access per beam may be allocated using a time division multiplexing (TDM) scheme. The information regarding the resource for the contention based multiple access allocated per beam may be applied to a subframe appearing after a prescribed number of subframes from a subframe in which the information on the resource for the contention based multiple access allocated per beam is transmitted.

To further achieve these objects and other advantages and in accordance with the purpose of the invention, as embodied and broadly described herein, according to a different embodiment, a base station for performing contention based multiple access (MA) in a wireless communication system includes a receiver configured to receive information regarding a best beam ID (identifier) from each user equipment (UE), a processor configured to allocate a resource for contention based multiple access per a beam based on a number of best beam ID per beam obtained from the information regarding the best beam ID received from the each UE, and a transmitter configured to transmit information regarding the resource for the contention based multiple access allocated per beam, to the each UE. In this case, an amount of the resource allocated by the processor for the contention based multiple access per beam may be allocated in proportion to the number of best beam ID per beam. The receiver may be configured to receive a contention based signal from a first UE on a resource for contention based multiple access in response to a beam reported by the first UE with a best beam ID. The resource for the contention based multiple access can be semi-persistently allocated per beam. The transmitter can be configured to transmit the information on the resource for the contention based multiple access, which is allocated per beam, through a broadcast message, RRC (radio resource control) signaling, or physical layer signaling. The reported best beam ID may be determined by a manner of being measured on a wideband. The amount of the resource allocated for the contention based multiple access per beam may correspond to a symbol unit or a slot unit. The resource allocated for the contention based multiple access per beam may be allocated using a time division multiplexing (TDM) scheme. The information regarding the resource for the contention based multiple access allocated per beam may be applied to a subframe appearing after a prescribed number of subframes from a subframe in which the information on the resource for the contention based multiple access, which is allocated per beam, is transmitted.

A contention based MA scheme according to the present invention is able to reduce not only signaling overhead but also signal collision probability between UEs in a New RAT system supporting massive connectivity of mMTC.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram for an example of assigning a different frequency band size according to a beam;

DETAILED DESCRIPTION OF THE INVENTION

Figure 1:
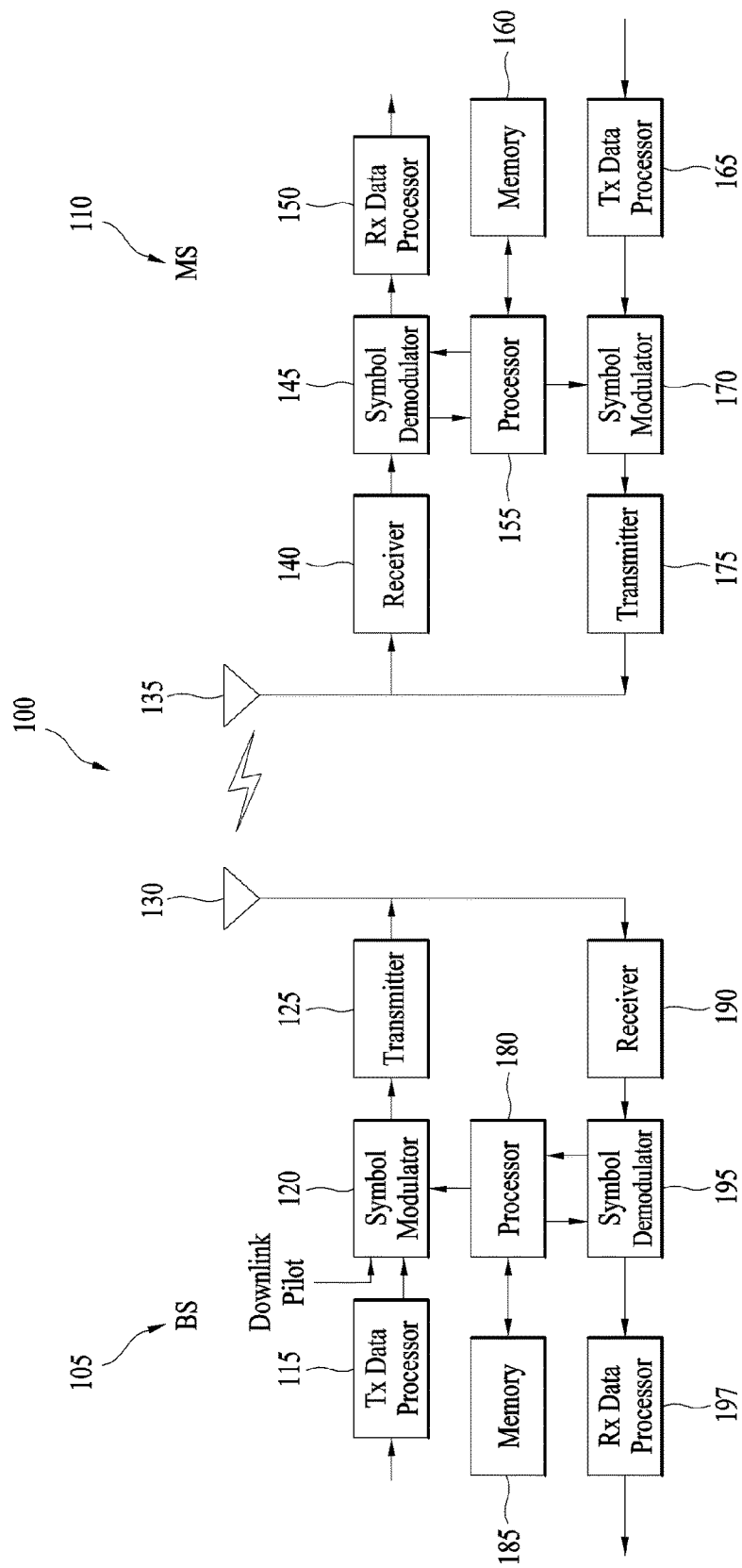
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system, 3GPP LTE-A, or 5G system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
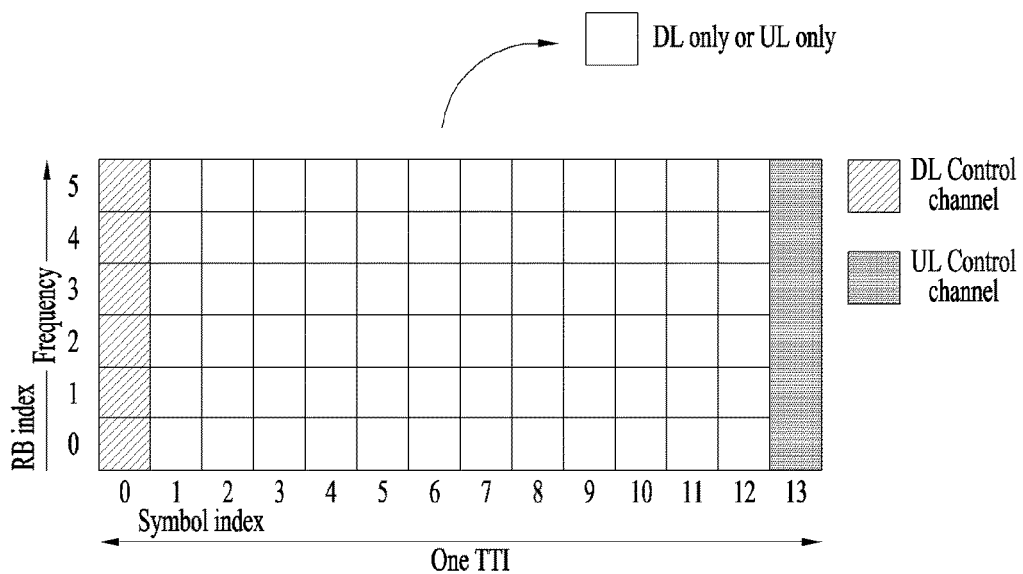
FIG. 2 is a diagram for an example of a subframe structure that TDM is performed on a data channel and a control channel.

In order to minimize latency in a fifth generation New RAT, it may consider a TDM structure of a control channel and a data channel shown in FIG. 2 as one of frame structures.

FIG. 2 is a diagram for an example of a subframe structure that TDM is performed on a data channel and a control channel.

FIG. 2 shows a subframe that a data channel and a control channel are TDM (time division multiplexed). Referring to FIG. 2, a slashed region corresponds to a downlink control region (i.e., a resource region in which a downlink control channel is transmitted) and a part represented by black color corresponds to an uplink control region (i.e., a resource region in which an uplink control channel is transmitted). In the subframe shown in FIG. 2, a region having no sign can be used not only for downlink data transmission but also for uplink data transmission. As a characteristic of the aforementioned structure, downlink (DL) transmission and uplink (UL) transmission are sequentially performed in a subframe. Hence, it may transmit DL data and receive UL ACK/NACK in a subframe. As a result, when a data transmission error occurs, it may be able to reduce time taken for retransmission and minimize latency of final data transmission.

In the subframe structure that the data channel and the control channel are TDM, in order for a base station and a UE to switch to a reception mode from a transmission mode or switch to the transmission mode from the reception mode, it is necessary to have a time gap. To this end, a partial OFDM (orthogonal frequency division multiplexing) symbol at the time of switching to UL from DL is set to a guard period (GP) in the subframe structure.

Since a wavelength becomes shorter in the mmW, it is able to install a plurality of antennas in the same area. In particular, since a wavelength corresponds to 1 cm in 30 GHz band, it is able to install 100 antenna elements in total in a panel of 5 by 5 cm in a form of 2-dimension array with an interval of 0.5 lambda (wavelength). Hence, it may be able to increase a beamforming (BF) gain using a plurality of antenna elements in the mmW to increase coverage or throughput.

In this case, if it is able to have a TXRU (transceiver unit) capable of controlling transmit power and a phase according to an antenna element, it is able to perform independent beamforming according to a frequency resource. However, if a TXRU is installed in all of antenna elements more than 100, it may have a problem that effectiveness is degraded in terms of cost. Hence, it may consider a method that a plurality of antenna elements are mapped to a single TXRU and a beam direction is controlled by an analog phase shifter. Since the aforementioned analog beamforming method generates a single beam direction only for the entire band, the method has a demerit in that frequency-selective beaming is not available.

As an intermediate form between digital BF and analog BF, it may consider hybrid BF having B number of TXRUs which is less than Q number of antenna elements. In this case, although there is a difference depending on a scheme of connecting the B number of TXRUs and the Q number of antenna elements, the number of beam directions capable of being transmitted at the same time is restricted to B or less.

When a plurality of antennas are used in the New RAT system, a hybrid beamforming scheme that digital beamforming and analog beamforming are combined is emerging. In this case, the analog beamforming (RF beamforming) corresponds to an operation of performing precoding (combining) at an RF end. In case of the hybrid beamforming, each of a baseband end and an RF end performs precoding (combining). By doing so, it is able to have performance close to performance of the digital beamforming while the number of RF chains and the number of D/A converters (A/D converters) are reduced. For clarity, a structure of the hybrid beamforming can be represented by N number of transceiver units (TRXUs) and M number of physical antennas. Then, digital beamforming for L number of data layers to be transmitted by a transmission end (transmission side) can be represented by N by L matrix. Subsequently, N numbers of converted digital signals are converted into analog signals via TXRU. Analog beamforming represented by M by N matrix is applied to the analog signals.

Figure 3:
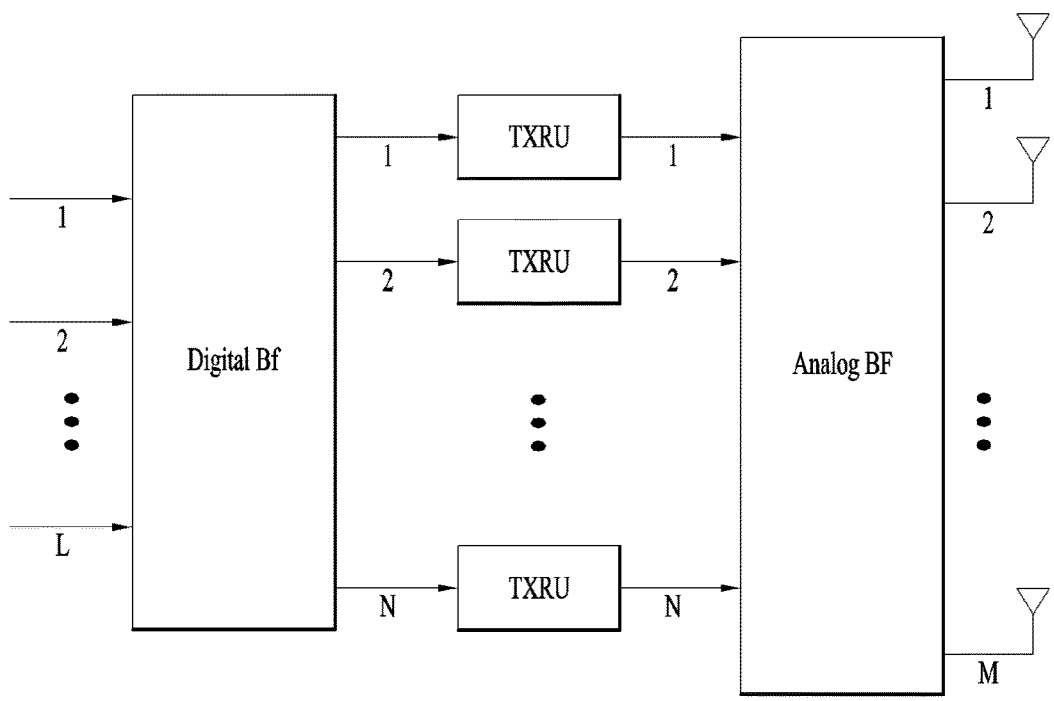
FIG. 3 is a diagram for a hybrid beamforming structure abstractly schematized in terms of a TXRU and a physical antenna.

FIG. 3 is a diagram for a hybrid beamforming structure abstractly schematized in terms of a TXRU and a physical antenna.

Referring to FIG. 3, the number of digital beams corresponds to L and the number of analog beams corresponds to N. Moreover, in the New RAT system, a base station is configured to change analog beamforming in a symbol unit to support more efficient beamforming to a UE located at a specific region. Moreover, if specific N number of TXRUs and M number of RF antennas are defined as a single antenna panel, it may consider a method of introducing a plurality of antenna panels capable of applying independent hybrid beamforming in the New RAT system.

As mentioned in the foregoing description, when a base station utilizes a plurality of analog beams, since an analog beam profitable for receiving a signal varies according to a UE, it is necessary to consider a beam sweeping operation to make all UEs have a reception opportunity. The beam sweeping operation can be performed in a manner that a base station changes a plurality of analog beams according to a symbol in a specific subframe (SF) for at least one selected from the group consisting of a synchronization signal, system information, and paging.

Figure 4:
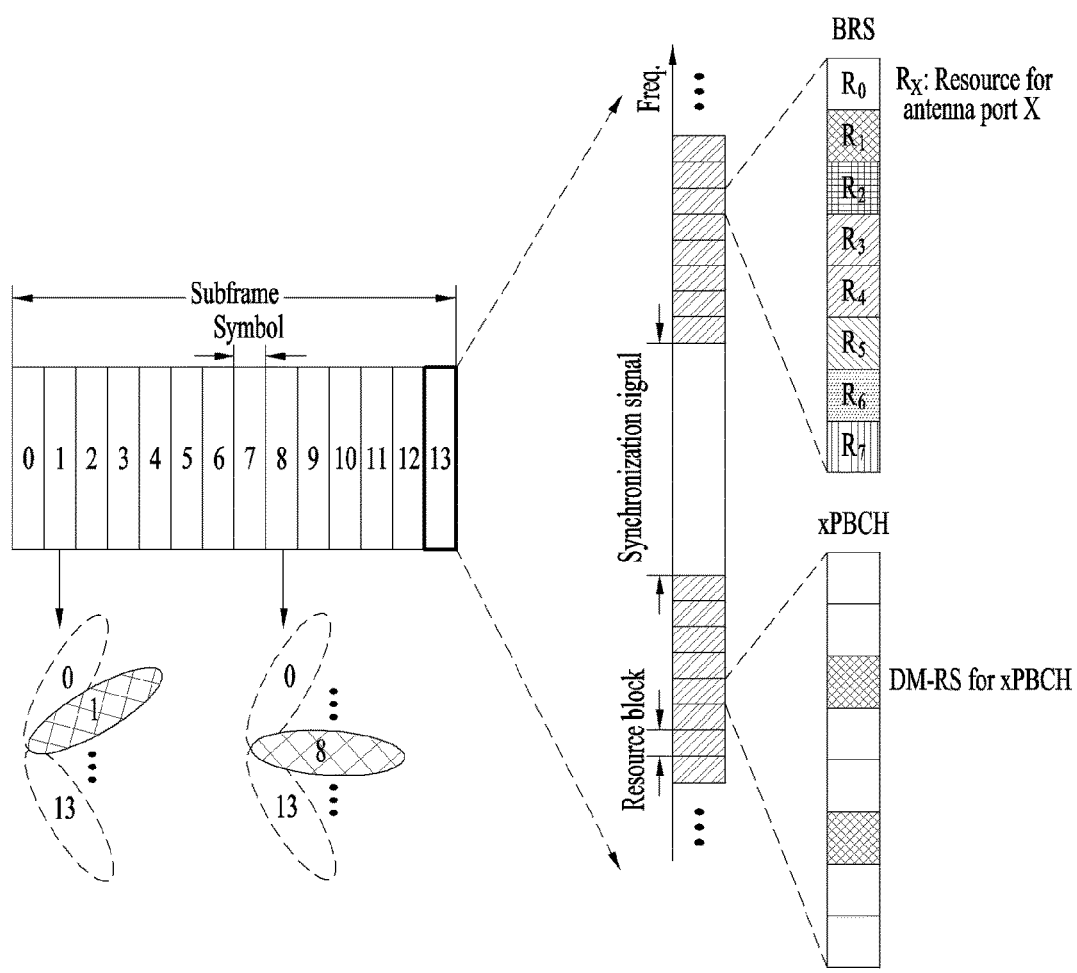
FIG. 4 is a schematic diagram of a beam sweeping operation for a synchronization signal and system information in a downlink (DL) transmission procedure.

FIG. 4 is a schematic diagram of a beam sweeping operation for a synchronization signal and system information in a downlink (DL) transmission procedure.

In FIG. 4, a physical resource (or a physical channel) on which system information of the New RAT system is transmitted by a broadcasting scheme is referred to as xPBCH (physical broadcast channel). In this case, analog beams belonging to a different antenna panel in a symbol can be transmitted at the same time. As shown in FIG. 4, in order to measure a channel according to an analog beam, it may consider a method of introducing a beam RS (BRS) corresponding to a reference signal (RS) to which a single analog beam (corresponding to a specific antenna panel) is applied. The BRS can be defined for a plurality of antenna ports and each antenna port of the BRS may correspond to a single analog beam. In this case, unlike the BRS, a synchronization signal or a physical broadcast channel (e.g., xPBCH) can be transmitted in a manner that all analog beams belonging to an analog beam group are applied to the synchronization signal or the physical broadcast channel to make a random UE easily receive the synchronization signal or the physical broadcast channel.

In the following, the present invention proposes a method of adaptively allocating a UL reserved resource for contention based multiple access (MA).

It is necessary to design the New RAT system capable of supporting massive connectivity of mMTC corresponding to new services. The number of UEs considered by mMTC environment corresponds to $10^6/km^2$. The mMTC environment supports considerably large number of UEs compared to a legacy LTE system. In general, traffic of mMTC UEs is burst and is mainly considered as data of a relatively small size (e.g., 200 bytes). Hence, similar to eMBB scenario, it may consider a contention based transmission scheme rather than a scheduling based transmission scheme. This is because the scheduling scheme requires signaling overhead greater than a data to be transmitted. As a result, if the contention based transmission scheme is used and the contention based transmission scheme is appropriately managed, it may be able to construct a system more efficient than the scheduling scheme. And, a resource allocation scheme mainly used for the contention based transmission corresponds to a semi-persistent (SP) resource form. In particular, if a network periodically secures a resource of a prescribed size, UEs configured to perform the contention based transmission may attempt to transmit data in the resource.

Unlike the scheduling resource allocation scheme, collision between data of UEs is unavoidable in the contention based transmission. Hence, a network can reduce a collision probability by securing sufficient SP resources. However, if the network secures excessive SP resources, resource efficiency of the network is degraded. As a result, it may lead to the deterioration of throughput of the network. Hence, it is necessary to consider allocating an SP resource of an appropriate size.

The New RAT system also considers analog beamforming (analog BF). In particular, mmWave considers extending coverage based on a plurality of antennas through the analog BF. Hence, it is essential to design a system in consideration of the analog BF not only in the mmWave band but also in a band equal to or less than 6 GHz. And, it is able to distinguish a case of a single BF from a case of multiple BFs according to capability of an eNB. In this case, the single BF indicates a case that analog BF is performed in a single direction only in a symbol. On the contrary, the multiple BFs indicate a case that analog BF is performed in multiple directions in a symbol. And, when beam reciprocity, i.e., a transmission beam, is received, the New RAT considers applying the transmission beam as an identical beam. This can especially effective in a TDD (time division duplex) band.

As mentioned in the foregoing description, the present invention relates to a method of adaptively allocating and configuring an SP resource according to a beam, i.e., a UL reserved resource, for contention based transmission. The method may bring about an effect that appropriately maintains a collision probability. In this case, the collision probability is determined based on a size of an SP resource and the number of candidate active UEs capable of performing the contention based transmission.

As mentioned in the foregoing description, the single beam case performs the analog BF in one direction only in a symbol. Hence, in order to perform beaming in many directions, it is necessary to differentiate direction of BF in a unit of a symbol, a slot, or a symbol. In this case, if the same number of symbols is basically assigned to all beams, it may be able to assign an opportunity to UEs belonging to each beam. However, if the number of UEs belonging to each beam is different, it is apparent that it is unable to maintain the same collision probability. Hence, it is necessary to consider a method of maintaining a collision probability by differently identifying a TDM resource according to a beam.

Embodiment 1

A UE transmits a report on a best beam ID (identifier) to a base station. Then, the base station adaptively allocates a reserved resource according to a beam based on the best beam ID reported by each UE and may be then able to inform each UE of information on a resource allocated according to a beam. A UE attempts to perform contention based MA transmission in a reserved resource corresponding to the best beam ID reported by the UE only.

If a UE reports a plurality of best beam IDs, the UE can perform the contention based MA transmission in reserved resources corresponding to a plurality of beam IDs only. In this case, the reserved resource may correspond to a symbol, a group of symbols, a slot, a group of slots, or a subframe. A base station can inform a UE of system information on a configuration of a reserved resource according to a beam via a broadcast message, higher layer signaling (e.g., RRC signaling), physical layer signaling (e.g. DCI (downlink control information)), or the like. A configuration type (e.g., number of symbol according to a beam) of a TDM scheme can be predefined between a base station and a UE.

A reserved resource according to a beam newly informed by a base station can be applied after the prescribed number of subframes. In this case, the prescribed number may correspond to a value equal to or greater than 0. The base station can inform the UE of the value as well. The best beam ID reporting of the UE can be performed by triggering of the base station or can be initiated by the UE.

Figure 5:
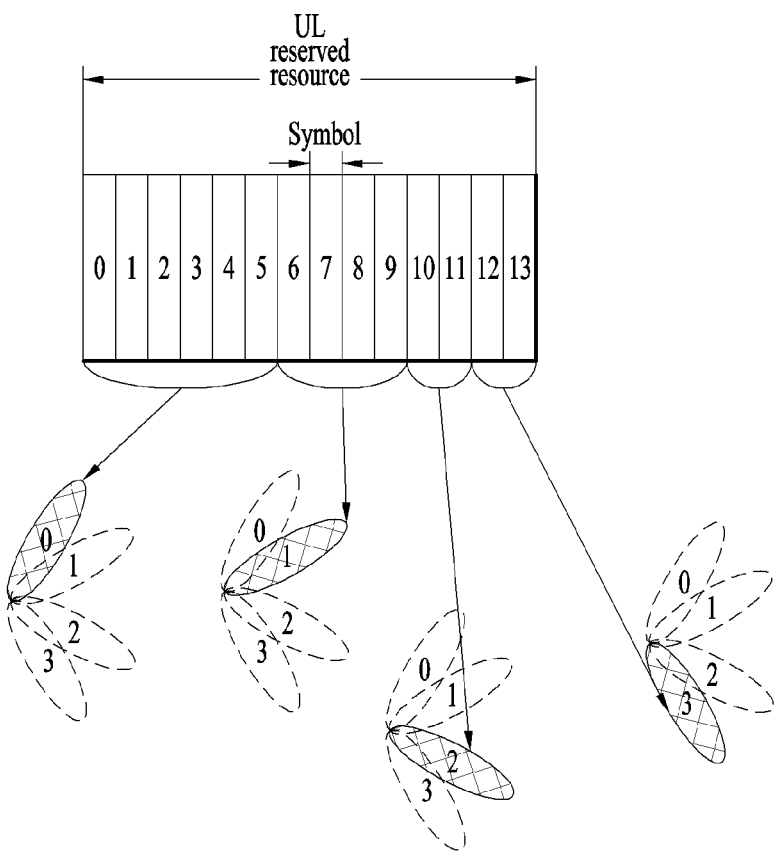
FIG. 5 is a diagram for an example of a pool of UL reserved resources consisting of 14 symbols in total.

FIG. 5 shows an example of the embodiment 1. FIG. 5 shows an example of configuring a UL reserved resource corresponding to a beam ID, when total 4 beams are configured and best id values reported by UEs correspond to 6:4:2:2.

FIG. 5 is a diagram for an example of a pool of UL reserved resources consisting of 14 symbols in total. As mentioned in the foregoing description, the New RAT considers beam reciprocity (i.e., when a transmission beam is received, the transmission beam is applied as an identical beam). More specifically, assume that a beam reported by a UE as a best beam ID through downlink channel measurement also corresponds to a best beam at the time of transmitting an uplink signal (e.g., contention based signal transmission) to a base station by the UE.

The base station allocates symbols according to a beam in proportion to a ratio of the best beam ID reported by the UE. In particular, in order to allocate symbols in proportion to the ratio of the best beam id report values, the base station allocates 6 symbols in case of a beam 0, allocates 4 symbols in case of a beam 1, and allocates 2 symbols in case of a beam 2 and a beam 3. By doing so, it is able to maintain a collision probability set to a system according to a beam. A corresponding configuration can be predefined. For example, a configuration of a resource preconfigured for a case of 3:2:1:1 can be determined in advance and the configuration can be known to both a base station and a UE.

In terms of a UE, if a UE reports a best beam ID 0, the UE attempts to transmit data (e.g., contention based MA transmission) in UL reserved resources allocated to symbols ranging from indexes 0 to 5. If a UE reports a plurality of best beam IDs, for example, if the UE reports two IDs including a beam 0 and a beam 1 as best beam ID, the UE may attempt to transmit data (e.g., contention based MA transmission) in two resource regions corresponding to symbols ranging from indexes 0 to 5 and symbols ranging from indexes 6 to 9.

Figure 6:
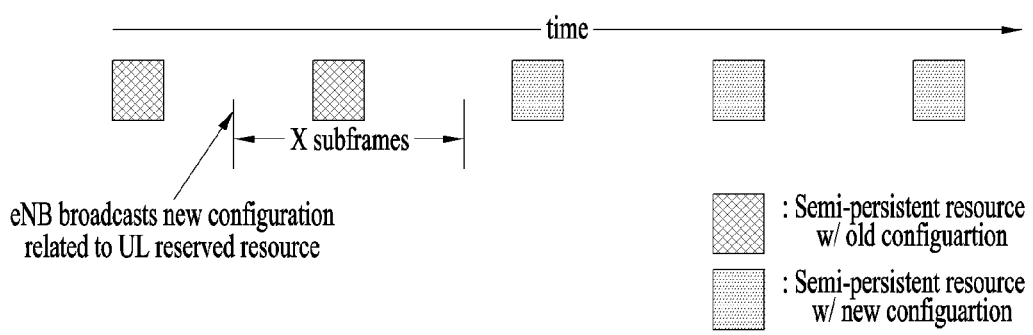
FIG. 6 is a diagram for explaining update timing of a UL reserved resource mentioned in embodiment 1.

FIG. 6 is a diagram for explaining update timing of a UL reserved resource mentioned earlier in embodiment 1.

As shown in FIG. 6, it may be able to recognize a new configuration and perform transmission for an SP resource located after X subframes from the timing that an eNB performs the new configuration. In this case, as shown in the example of FIG. 5, the configuration indicates an SP according to a beam or a size of a UL reserved resource. The update can be performed via RRC signaling or the like. A value of the X can also be configured by RRC signaling.

Embodiment 2

Unlike the aforementioned single beam case, a multiple beam case corresponds to a case capable of transmitting and receiving a signal at the same time through a plurality of beams. Hence, it is able to receive a signal through multiple beams for the same time and the same frequency. Of course, in case of a base station having capability of multiple beams, the base station may operate in a single beam form and the operation is identical to the operation mentioned earlier in embodiment 1. In this case, as shown in FIG. 7, assume that there are many beams in a symbol.

Figure 7:
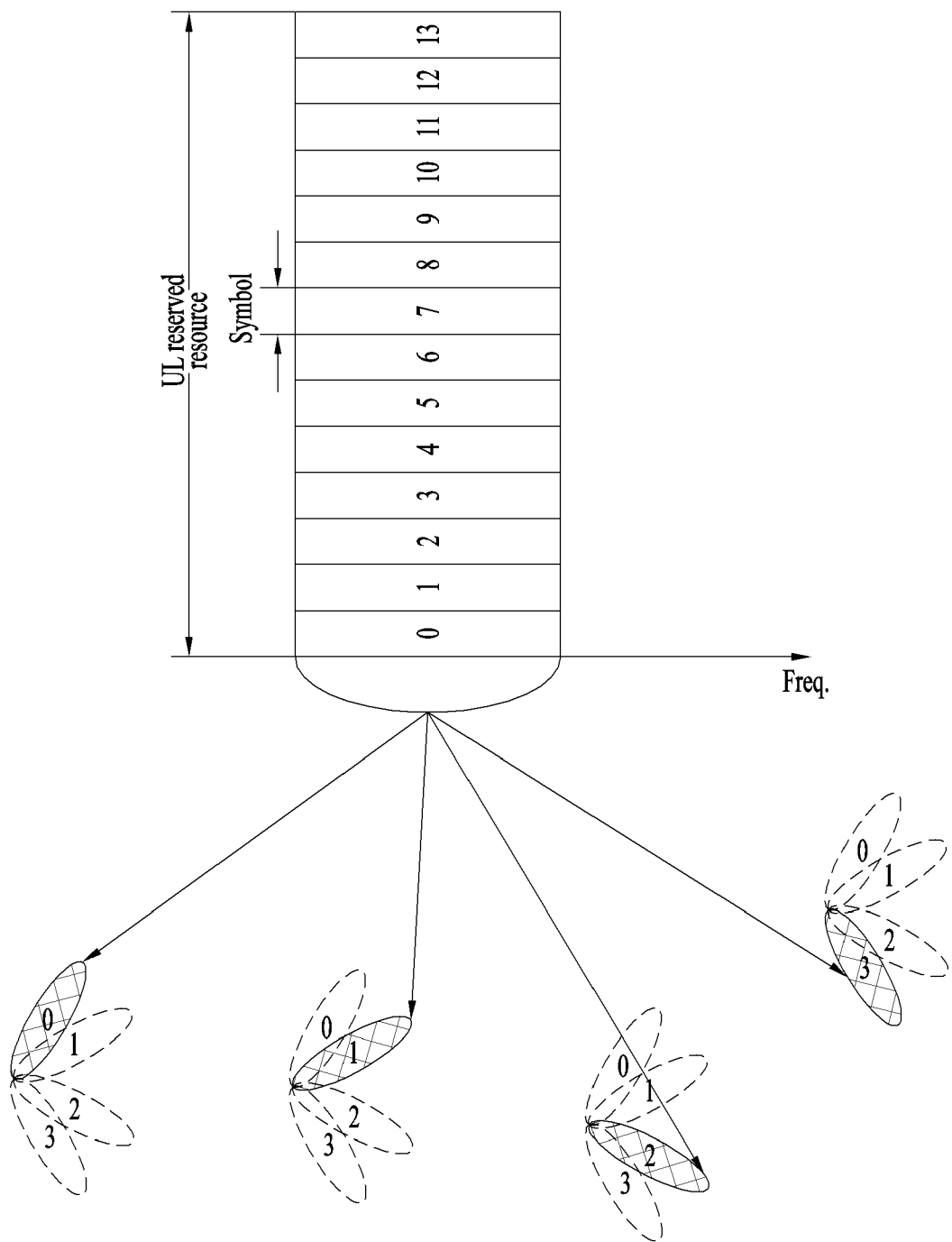
FIG. 7 is a diagram for an example of multiple beams that 4 beams support the entire time and frequency domains at the same time.

FIG. 7 is a diagram for an example of multiple beams that 4 beams support the entire time and frequency domains at the same time.

A UE transmits a report on a best beam ID (identifier) to a base station. Then, the base station adaptively allocates a reserved resource according to a beam based on the best beam ID reported by each UE and may be then able to inform each UE of information on a resource allocated according to a beam. A UE attempts to perform contention based MA transmission in a reserved resource corresponding to the best beam ID reported by the UE only.

If a UE reports a plurality of best beam IDs, the UE can perform the contention based MA transmission in reserved resources corresponding to a plurality of beam IDs only. In this case, the reserved resource may correspond to a symbol, a group of symbols, a slot, a group of slots, or a subframe. A base station can inform a UE of system information on a configuration of a reserved resource according to a beam via a broadcast message, higher layer signaling (e.g., RRC signaling), physical layer signaling (e.g. DCI (downlink control information)), or the like.

A configuration type for a frequency domain different from each other according to a beam can be predefined between a base station and a UE. In this case, a size of a frequency domain may vary according to a beam. A reserved resource according to a beam newly informed by a base station can be applied after prescribed number of subframes. In this case, the prescribed number may correspond to a value equal to or greater than 0 and the base station can also inform the UE of the value. The best beam id report of the UE can be performed by triggering of the base station or can be initiated by the UE. In FIG. 7, a scheduled UE data can be assigned to a partially overlapped region between beams.

FIG. 8 shows an example of the embodiment 2. FIG. 8 shows an example of configuring a UL reserved resource corresponding to a beam ID, when total 4 beams are configured and best beam id values reported by UEs correspond to 1:2:3:4.

Referring to FIG. 8, a frequency band of a size different from each other according to a beam is assigned to a contention based transmission zone. In particular, FIG. 8 is a diagram for an example of assigning a different frequency band size according to a beam. In this case, for example, the size of the frequency band is identically applied based on a ratio of a best beam id report value.

In particular, a base station assigns 1 subband (SB) to a beam 0, assigns total 2 SBs to a beam 1, assigns total 3 SBs to a beam 2, and assigns total 4 SBs to a beam 4 as a contention zone to assign SB in a manner of being identical to a ratio of best beam ID report values. By doing so, it may be able to maintain a collision probability set to a system according to a beam. The configuration can be predefined in advance between a base station and a UE.

Although an SB corresponds to a contention based transmission zone for a beam, the SB can also be assigned for scheduling based data transmission for a different beam. For example, although an SB #2 is used for transmitting a scheduling based data for a beam 0, the SB #2 is assigned to perform contention based transmission for a beam 1, a beam 2, and a beam 3. Hence, a UE has a chance for transmitting contention based MA in a UL reserved resource which is allocated based on a beam ID report value. And, in case of multiple reporting, the UE has a transmission opportunity for multiple resources.

In this case, the best ID report of the UE can be measured and reported on a wideband. Or, if the base station configures the UE to report a partial band or a subband, the UE may utilize a best beam ID report on the subband.

The embodiment 2 can be designed without interference when an analog beam is well recognized. Yet, it may be difficult to control interference between adjacent analog beams. Hence, although throughput capability of a network is partially sacrificed, it may consider a method of increasing performance by controlling interference well. In this case, it may be able to maintain a collision probability in terms of a system in a manner of matching the collision probability with a beam at which most active UE candidates are located.

Embodiment 3

A UE transmits a report on a best beam ID (identifier) to a base station. Then, the base station adaptively allocates a reserved resource according to a beam based on the best beam ID reported by each UE and may be then able to inform each UE of information on a resource allocated according to a beam. A UE attempts to perform contention based MA transmission in a reserved resource corresponding to the best beam ID reported by the UE only.

If a UE reports a plurality of best beam IDs, the UE can perform the contention based MA transmission in reserved resources corresponding to a plurality of beam IDs only. In this case, the reserved resource may correspond to a symbol, a group of symbols, a slot, a group of slots, or a subframe. A base station can inform a UE of system information on a configuration of a reserved resource according to a beam via a broadcast message, higher layer signaling (e.g., RRC signaling), physical layer signaling (e.g. DCI (downlink control information)), or the like.

Figure 9:
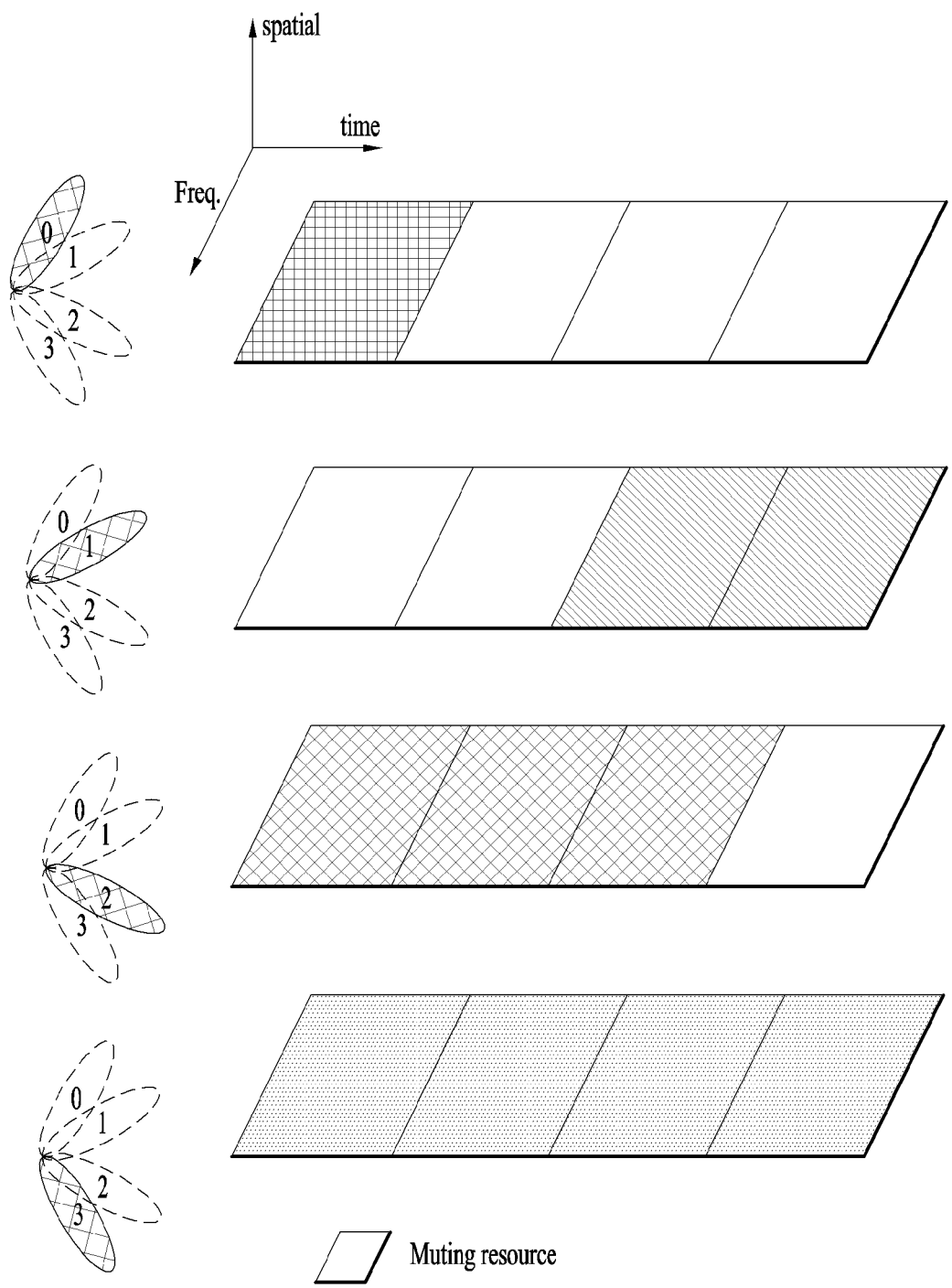
FIG. 9 is a diagram for an example of allocating a UL reserved resource via muting in consideration of interference according to embodiment 3.

A configuration type for a frequency domain different from each other according to a beam can be predefined between a base station and a UE. In this case, a size of a frequency domain may vary according to a beam. A reserved resource according to a beam newly informed by a base station can be applied after prescribed number of subframes. In this case, the prescribed number may correspond to a value equal to or greater than 0 and the base station can also inform the UE of the value. The best beam id report of the UE can be performed by triggering of the base station or can be initiated by the UE. In FIG. 9, it is unable to assign a scheduled UE data to a partially overlapped region between beams. In the foregoing description, it may be able to differentiate a muting region according to a beam.

FIG. 9 is a diagram for an example of allocating a UL reserved resource via muting in consideration of interference according to embodiment 3. FIG. 9 shows an example of configuring a UL reserved resource corresponding to a beam ID, when total 4 beams are configured and best beam id values reported by UEs correspond to 1:2:3:4. As shown in FIG. 9, a base station allocates a size of a UL reserved resource in accordance with a ratio of a reported value according to a beam and performs muting on the remaining resources to reduce interference between beams. For example, since it is highly probable that interference is strong between a beam 0 and a beam 1 adjacent to each other, it may be able to expect good performance by separating resources as far as possible through FDM (frequency division multiplexing). In particular, it may consider a muting pattern for maximizing a space between adjacent beams. In this case, the muting pattern can be predefined and a base station can inform a UE of an index of the pattern.

According to the aforementioned embodiments, a base station allocates a contention based transmission region based on a best beam id report value of a UE and informs the UE of the contention based transmission region. The UE has a chance for performing contention based MA transmission in a reserved resource corresponding to the best beam id report value of the UE received from the base station.

And, all of the embodiments of the present invention can be applied to a measurement scheme measured through an RS capable of being connected with a beam id. For example, when a UE estimates a best beam using a CSI-RS (channel state information-reference signal), the embodiments of the present invention can be identically applied by tying a beam id with a CSI-RS port number. And, the embodiments of the present invention can be identically applied by tying a CSI-RS port number and a symbol index with a beam id.

The technologies mentioned earlier in the foregoing description can be applied to schemes that use a semi-persistent resource. And, the technologies can be identically used for a UL grant-free transmission scheme in URLLC environment to reduce latency.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing contention based multiple access (MA) by a base station in a wireless communication system, comprising the steps of:
   receiving information on a best beam ID (identifier) from each user equipment (UE);
   allocating a resource for contention based multiple access per a beam based on a number of best beam ID per beam obtained from the information regarding the best beam ID received from the each UE; and
   transmitting information regarding the resource for the contention based multiple access allocated per beam, to the each UE,
   wherein an amount of the resource allocated for the contention based multiple access per beam is in proportion to the number of best beam ID per the beam.

2. The method of claim 1, further comprising:
   receiving a contention based signal from a first UE on a resource for contention based multiple access for a beam reported as a best beam ID from the first UE.

3. The method of claim 1, wherein the resource for the contention based multiple access is semi-persistently allocated per beam.

4. The method of claim 1, wherein the information regarding the resource for the contention based multiple access allocated per beam, is transmitted through a broadcast message, radio resource control (RRC) signaling, or physical layer signaling.

5. The method of claim 1, wherein the reported best beam ID is determined by a manner of being measured on a wideband.

6. The method of claim 1, wherein the amount of the resource allocated for the contention based multiple access per beam corresponds to a symbol unit or a slot unit.

7. The method of claim 1, wherein the resource for the contention based multiple access per beam is allocated using a time division multiplexing (TDM) scheme.

8. The method of claim 1, wherein the information regarding the resource for the contention based multiple access allocated per the beam is applied to a subframe appearing after a prescribed number of subframes from a subframe in which the information regarding the resource for the contention based multiple access allocated per beam is transmitted.

9. A base station for performing contention based multiple access (MA) in a wireless communication system, the base station comprising:
   a receiver configured to receive information regarding a best beam ID (identifier) from each user equipment (UE);
   a processor configured to allocate a resource for contention based multiple access per beam based on a number of best beam ID per beam obtained from the information regarding the best beam ID received from the each UE; and
   a transmitter configured to transmit information regarding the resource for the contention based multiple access allocated per beam, to the each UE,
   wherein an amount of the resource allocated by the processor for the contention based multiple access according to the beam is in proportion to the number of best beam ID per beam.

10. The base station of claim 9, wherein the receiver is configured to receive a contention based signal from a first UE on a resource for contention based multiple access for a beam reported as a best beam ID from the first UE.

11. The base station of claim 9, wherein the resource for the contention based multiple access is semi-persistently allocated per beam.

12. The base station of claim 9, wherein the transmitter is configured to transmit the information regarding the resource for the contention based multiple access allocated per beam through a broadcast message, radio resource control (RRC) signaling, or physical layer signaling.

13. The base station of claim 9, wherein the reported best beam ID is determined by a manner of being measured on a wideband.

14. The base station of claim 9, wherein the amount of the resource allocated for the contention based multiple access per beam corresponds to a symbol unit or a slot unit.

15. The base station of claim 9, wherein the resource for the contention based multiple access per beam is allocated using a time division multiplexing (TDM) scheme.

16. The base station of claim 9, wherein the information regarding the resource for the contention based multiple access, which is allocated according to the beam, is applied to a subframe appearing after a prescribed number of subframes from a subframe in which the information regarding the resource for the contention based multiple access allocated per beam is transmitted.

* * * * *